(12) United States Patent
Royalty et al.

(10) Patent No.: US 9,478,048 B2
(45) Date of Patent: Oct. 25, 2016

(54) PRIOR IMAGE BASED THREE DIMENSIONAL IMAGING

(71) Applicant: Siemens Medical Solutions USA, Inc., Malvern, PA (US)

(72) Inventors: Kevin Royalty, Fitchburg, WI (US); Sebastian Schafter, Madison, WI (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 151 days.

(21) Appl. No.: 14/322,031

(22) Filed: Jul. 2, 2014

(65) Prior Publication Data

US 2016/0005192 A1  Jan. 7, 2016

(51) Int. Cl.
*G06K 9/00* (2006.01)
*G06T 11/00* (2006.01)
*G06T 15/00* (2011.01)
*G06T 7/00* (2006.01)
*G06T 19/00* (2011.01)

(52) U.S. Cl.
CPC ........... *G06T 11/003* (2013.01); *G06T 7/0024* (2013.01); *G06T 15/00* (2013.01); *G06T 19/00* (2013.01); *G06T 2207/10072* (2013.01); *G06T 2207/30101* (2013.01); *G06T 2210/41* (2013.01); *G06T 2211/416* (2013.01); *G06T 2219/008* (2013.01)

(58) Field of Classification Search
USPC ........................................................ 382/131
See application file for complete search history.

(56) References Cited

U.S. PATENT DOCUMENTS

| 2005/0203385 A1* | 9/2005 | Sundar | G06T 7/0028 600/427 |
| 2008/0247622 A1* | 10/2008 | Aylward | A61B 90/36 382/131 |
| 2011/0026794 A1* | 2/2011 | Sundar | G06T 7/0028 382/131 |

OTHER PUBLICATIONS

Sundar et al, "A Novel 2D-3D Registration Algorithm for Aligning Fluoro Images with 3D Pre-op CT/MR Images", Medical Imaging 2006: Visualization, Image-Guided Procedures, and Display, Proc. of SPIE vol. 6141, 61412K (2006).*
J. Tang, B. E. Nett, and G. Chen, "Performance comparison between total variation (TV)-based compressed sensing and statistical iterative reconstruction algorithms.," Physics in medicine and biology, vol. 54, No. 19, pp. 5781-804, Oct. 2009.
G.-H. Chen, J. Tang, and S. Leng, "Prior image constrained compressed sensing (PICCS): A method to accurately reconstruct dynamic CT images from highly undersampled projection data sets," Medical Physics, vol. 35, No. 2, p. 660, 2008.
J. W. Stayman, W. Zbijewski, Y. Otake, A. Uneri, S. Schafer, J. Lee, J. L. Prince, and J. H. Siewerdsen, "Penalized-likelihood reconstruction for sparse data acquisitions with unregistered prior images and compressed sensing penalties," in SPIE Medical Imaging, 2011, p. 79611L-79611L.

(Continued)

*Primary Examiner* — Yon Couso

(57) ABSTRACT

Described herein are technologies for facilitating three-dimensional imaging based on prior image data. In accordance with one aspect, deformable registration is performed to align three-dimensional (3D) image data to a sparse set of two-dimensional (2D) projection image data of at least one structure of interest. An iterative reconstruction scheme may then be performed to minimize a difference between the aligned 3D image data and the 2D image data.

20 Claims, 5 Drawing Sheets

(56) References Cited

OTHER PUBLICATIONS

S. Schafer, S. Nithiananthan, D. J. Mirota, A. Uneri, J. W. Stayman, W. Zbijewski, C. Schmidgunst, G. Kleinszig, A. J. Khanna, and J. H. Siewerdsen, "Mobile C-arm cone-beam CT for guidance of spine surgery: Image quality, radiation dose, and integration with interventional guidance," Medical physics, vol. 38, p. 4563,2011.

S. Nithiananthan, K. K. Brock, J. C. Irish, J. H. Siewerdsen, and A. I. System, "Guidance of Head and Neck Surgery," pp. 1-4, 2008.

S. Nithiananthan, "Demons deformable registration for CBCT-guided procedures in the head and neck : Convergence and accuracy," no. October, pp. 4755-4764, 2009.

K. K. Brock, "Image Registration in Intensity-Modulated Radiation Therapy , Image-Guided Radiation Therapy and Stereotactic Body Radiation Therapy," vol. 40, pp. 94-115, 2007.

* cited by examiner

PRIOR IMAGE BASED THREE DIMENSIONAL IMAGING

TECHNICAL FIELD

The present disclosure relates generally to automated or partially-automated three-dimensional imaging based on prior image data.

BACKGROUND

Angiography is a common method used to represent blood vessels based on diagnostic imaging methods, such as X-ray or Magnetic Resonance Tomography (MRT). For an improved representation of the vessels under examination, Digital Subtraction Angiography (DSA) has been developed. DSA is fluoroscopy technique used in interventional radiology to clearly visualize vasculature in a bony or dense soft tissue environment. Images are produced by subtracting a 'pre-contrast image' or the mask from subsequent images after the contrast agent has been introduced into a structure or tissue of interest. These images can be used to provide time-resolved or time-varying information that shows the development of the structure or tissue of interest over time.

Repeated intraoperative 3D imaging of a patient's vascular topology during interventional procedures has enabled surgeons to effectively assess the surgical process and better estimate the surgical outcome. Interventional procedures may be made less invasive and the quality increased with the use of such intraoperative 3D imaging. While this repeated intraoperative imaging creates a wealth of image information, it also subjects the patient to increased radiation exposure, when compared to projection imaging. The increased radiation exposure limits the possibilities for repeated intraoperative 3D imaging.

SUMMARY

A technology for facilitating three-dimensional imaging based on prior image data is described herein. In accordance with one aspect, deformable registration is performed to align three-dimensional (3D) image data to a sparse set of two-dimensional (2D) projection image data of at least one structure of interest. An iterative reconstruction scheme may then be performed to minimize a difference between the aligned 3D image data and the 2D image data.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
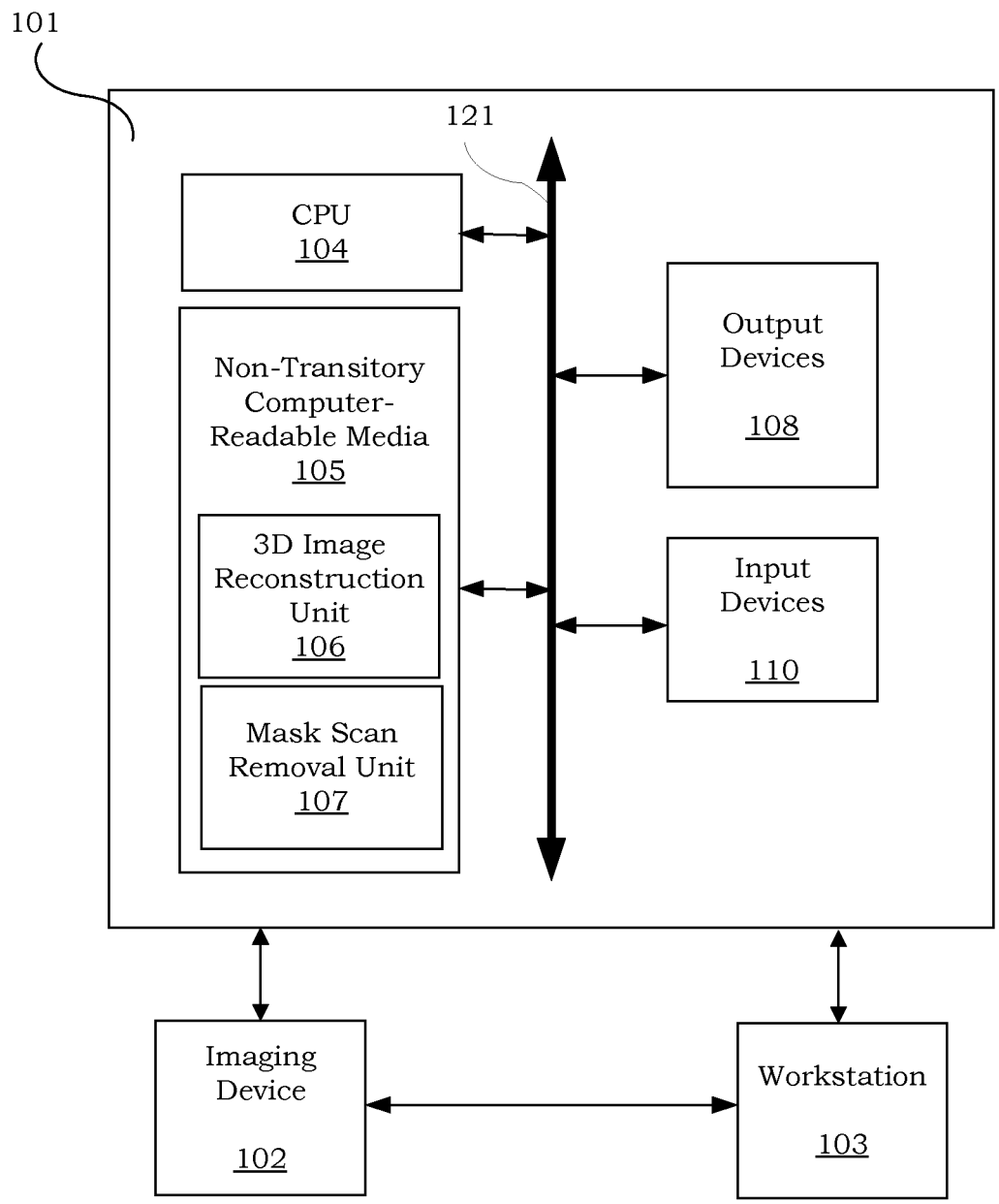
FIG. 1 is a block diagram illustrating an exemplary imaging system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, cone-beam CT (CBCT) imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulate and transform data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" or "image data" refers to multi-dimensional data composed of discrete image elements (e.g., pixels for 2D images and voxels for 3D images). The image may be, for example, a medical image of a subject collected by (cone-beam) computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The recent decade has seen increased interest in iterative reconstruction methods, with the majority of applications focusing on soft tissue reconstruction in diagnostic CT, and only recently have these methods been expanded to soft-tissue imaging using interventional C-arm cone-beam CT modalities. While these methods have shown good results in fully-sampled, single scan methods, the experience of incorporating prior knowledge into the reconstructions is limited.

With ever increasing computational power, methods with high computational burden may be applied in the angiography suite within a clinical time frame. The following description sets forth one or more implementations of systems and methods that facilitate 3D imaging based on prior image data. More particularly, numerical methods are presented for vascular imaging that may reduce radiation exposure to the patient while using available prior image data generated during the course of an interventional procedure. Prior image data may include initial scan image data (e.g., 3D image data, prior mask image data, etc.) acquired at a previous time point.

In accordance with one aspect of the present framework, when prior image data of a patient's vascular topology is available, changes in a patient's vascular topology are updated from few views using 3D reconstruction principles. The present framework provides improvements over existing 3D DSA acquisition methods that require acquisition of all viewing angles of the selected mode during rotation of the radiology scanner. Only a fraction of the previously necessary viewing angles are to be acquired, thereby reducing the cumulative radiation exposure to the patient and medical staff (e.g., physicians, radiologists, nurses, technicians, etc.).

In accordance with another aspect, when prior image data of a patient's anatomy is available, mask scans may be removed from a 3D DSA image acquisition chain. Using the prior image data as the mask image data, scan-to-scan registration may be performed to align a 3D mask dataset reconstructed from the prior mask image data with a 3D fill run dataset. By using prior mask image data already available from an earlier instance, around 50% of radiation dose per scan can advantageously be reduced.

FIG. 1 is a block diagram illustrating an exemplary imaging system 100. The imaging system 100 includes a computer system 101 for implementing the framework as described herein. The computer system 101 may be further connected to an imaging device 102 and a workstation 103, over a wired or wireless network. The imaging device 102 may be a radiology scanner such as a magnetic resonance (MR) scanner, X-ray or a CT scanner. In some implementations, imaging device 102 employs cone-beam CT (or C-arm CT, cone beam volume CT, flat panel CT, etc.) imaging technologies to acquire a volumetric or 3D dataset reconstructed from different views of the patient's anatomy or structure of interest. The imaging device 102 may include a scanner mounted on, for example, a C-arm that rotates around the patient's body to acquire distinct images representing multiple views. Different implementations of the imaging device 102 may include, for example, fixed-room C-arm, mobile U-arm, mobile O-arm, mobile C-arm, and so forth.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more non-transitory computer-readable media 105 (e.g., computer storage or memory), output devices 108 (e.g., monitor, display, printer, etc.) and various input devices 110 (e.g., mouse, keyboard, touch pad, voice recognition module, etc.) via an input-output interface 121. Computer system 101 may further include support circuits such as a cache, a power supply, clock circuits and a communications bus. Even further, computer system 101 may be provided with a graphics controller chip, such as a graphics processing unit (GPU) that supports high performance graphics functions.

It is to be understood that the present technology may be implemented in various forms of hardware, software, firmware, special purpose processors, or a combination thereof. In one implementation, the techniques described herein are implemented by 3D image reconstruction unit 106 and mask scan removal unit 107. 3D image reconstruction unit 106 and mask scan removal unit 107 may include computer-readable program code tangibly embodied in non-transitory computer-readable media 105. Non-transitory computer-readable media 105 may include random access memory (RAM), read only memory (ROM), magnetic floppy disk, flash memory, and other types of memories, or a combination thereof. The computer-readable program code is executed by CPU 104 to control and/or process image data from imaging device 102.

As such, the computer system 101 is a general-purpose computer system that becomes a specific-purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein. Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The workstation 103 may include a computer and appropriate peripherals, such as a keyboard and display, and can be operated in conjunction with the entire system 100. For example, the workstation 103 may communicate with the imaging device 102 so that the image data collected by the imaging device 102 can be rendered at the workstation 103 and viewed on the display. The workstation 103 may include a user interface that allows a radiologist or any other skilled user (e.g., physician, technician, operator, scientist, etc.), to manipulate the image data. For example, a user may identify structures or regions of interest in the image data, or annotate the structures or regions of interest using pre-defined descriptors via the user interface. Further, the workstation 103 may communicate directly with computer system 101 to display processed image data. For example, a radiologist can interactively manipulate the displayed representation of the processed image data and view it from various viewpoints and in various reading modes.

Figure 2:
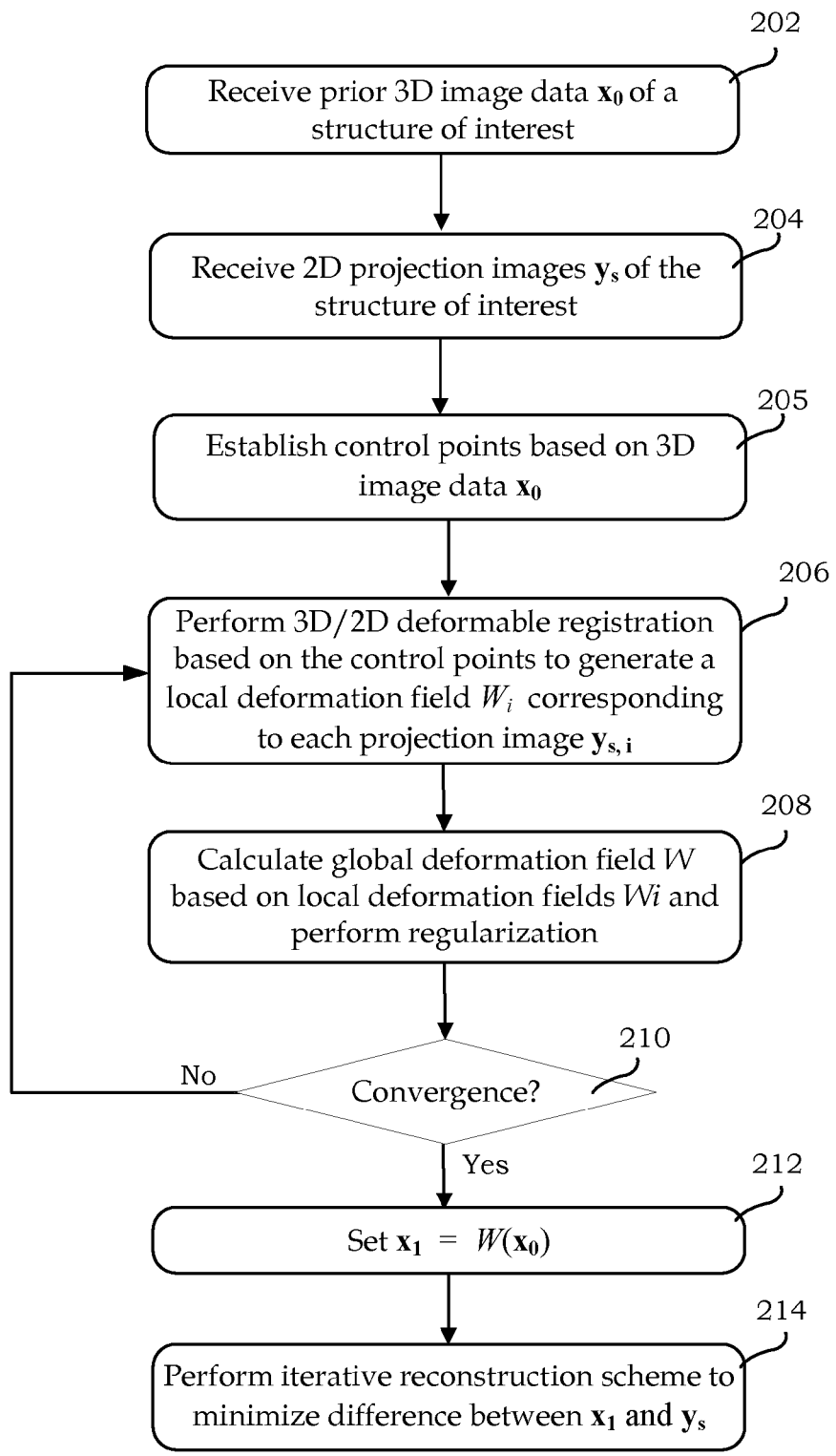
FIG. 2 shows an exemplary method of reconstructing vascular topology from few views.

FIG. 2 shows an exemplary method 200 of reconstructing vascular topology from few views. The exemplary method 200 may be implemented by the 3D image reconstruction unit 106 in computer system 101, previously described with reference to FIG. 1. It should be noted that in the following discussion, reference will be made, using like numerals, to the features described in FIG. 1.

At 202, 3D image reconstruction unit 106 receives initial prior 3D image data ($x_0$) of one or more structures of interest. The structure of interest may be any anatomical area or volume identified for further study and examination (e.g., blood vessels or vasculature). The initial prior 3D image data ($x_0$) provides the basis for subsequent 3D-2D registration. The initial prior 3D image data ($x_0$) may be acquired at an earlier time instance during an interventional operation on the patient by, for example, imaging device 102. The initial prior 3D image data ($x_0$) may include, for example, digital subtraction angiography (DSA) image data that facilitates visualization of blood vessels in a bony or dense soft tissue environment. In some implementations, imaging device 102 acquires the initial prior 3D image data ($x_0$) intraoperatively using a combination of mask (i.e. no contrast) and fill (i.e. with contrast) 3D image acquisitions. If 3D vessel-only image data is already available from a pre-operative CT or MR acquisition and stored in a data source (e.g., database), or determined using a segmentation method (e.g., region growing, thresholding, etc.), imaging device 102 may perform only a fill 3D image acquisition (i.e. with contrast) intraoperatively and retrieve the pre-operative 3D vessel-only image data from the data source.

At 204, 3D image reconstruction unit 106 receives a sparse set of subtracted 2D projection images ($y_s$) of the same one or more structures of interest. The 2D projection images may be acquired during the interventional operation (i.e., intraoperatively) and after the prior 3D image data is acquired. The subtracted 2D image data may be generated by first acquiring a mask image and subsequent fill-run images (after contrast medium is introduced into the one or more structures of interest) and subtracting the mask image from the fill-run images. Each subtracted fill-run or projection image represents a 2D projection view of the patient's anatomy. Unlike typical 3D DSA methods that require all viewing angles of the selected mode to be acquired, the sparse set of 2D projection image data ($y_s$) corresponds to only a small fraction of those viewing angles, thereby advantageous sly reducing radiation exposure to the patient. The 2D projection image data ($y_s$) may correspond to, for example, two or more viewing angles, with more angles providing higher accuracy.

Figure 3:
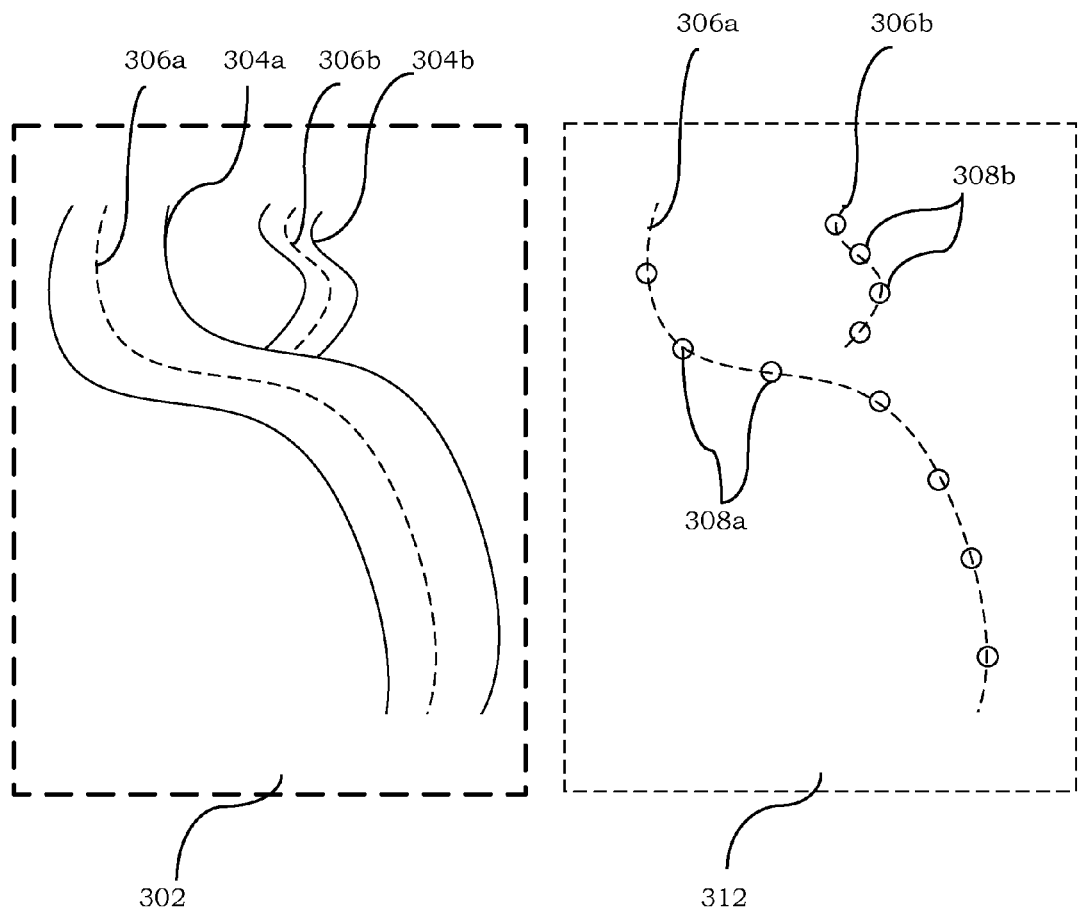
FIG. 3 illustrates an exemplary method of establishing control points for driving a deformable registration.

At 205, 3D image reconstruction unit 106 establishes control points based on the initial prior 3D image data ($x_0$). Such control points may be used to drive a 3D/2D deformable registration in a subsequent step. FIG. 3 illustrates an exemplary method of establishing control points for driving the deformable registration. More particularly, a prior 3D image ($x_0$) 302 of a patient's 3D vasculature (304a-b) is shown. Corresponding 3D centerline 306a-b of the 3D vasculature (304a-b) is determined. In some implementations, the centerline 306a-b is defined as a thin representation that is equidistant from at least two or three voxels on the vasculature's boundary surface (or inner wall surface). Alternatively, the centerline 306a-b may be defined as the locus of the centers of maximal spheres contained in the structure 304a-b. Various techniques may be employed to compute the centerline 306a-b. For example, skeletonization methods, such as distance transform, morphological thinning, path planning, flux-driven methods, extraction from level sets, and so forth, may be applied.

Image 312 shows the extracted centerline 306a-b. To establish control points 308a-b, the extracted centerline 306a-b may be sparsified. Sparsification may be performed by, for example, sampling the centerline 306a-b at regular intervals to establish the 3D coordinates of the control points 308a-b. In other implementations, sampling the centerline at irregular intervals may also be possible.

Turning back to FIG. 2, at 206, 3D image reconstruction unit 106 performs 3D/2D deformable (or non-rigid) registration based on the established control points 308a-b to generate a local deformation field W that transforms the initial prior 3D image data ($x_0$) to better match or align with each 2D projection image ($y_{s,i}$). The deformable registration may be performed based on the assumption that there is deformation of the structure of interest in between acquisitions of the 2D projection images $y_s$ (e.g., due to patient motion).

For each available view or projection image $y_{s,i}$, a 3D/2D deformable registration may be performed by determining a local deformation field $W_i$ that minimizes the following function f:

$$\arg\min(f[A_i(W_i(x_0))-(y_{s,i}),R(W_i(x_0))])$$

where $A_i$ is a local system matrix and R is a constraining function, constraining the global deformation to a smoothly varying deformation field, minimizing outliers and erroneous deformations.

Figure 4:
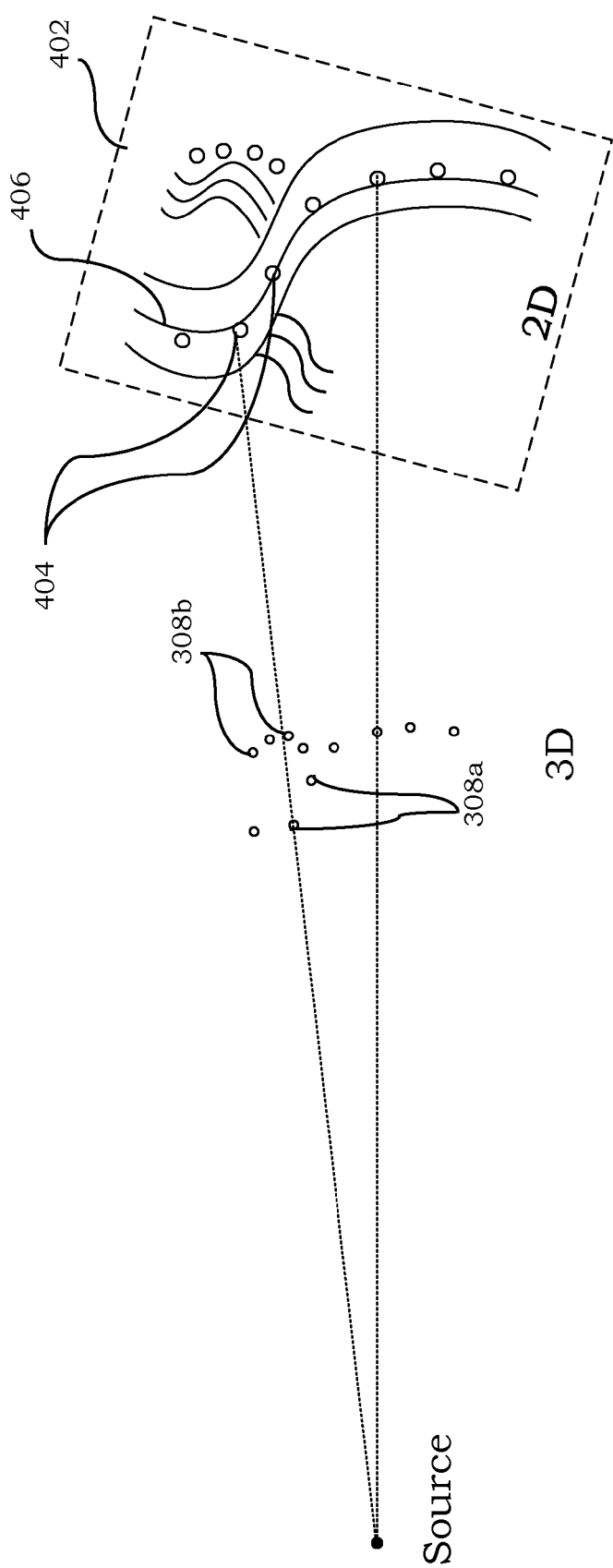
FIG. 4 illustrates an exemplary method of determining a local deformation field.

More particularly, the centerline of the one or more structures of interest in the 3D image data may be deformed along the established control points. The determined local deformation field may be interpolated using a spline (e.g., B-spline or thin-plate spline). FIG. 4 illustrates an exemplary method of determining the local deformation field W. The initially un-deformed 3D control points 308a-b are projected onto a newly acquired 2D projection image $y_{s,i}$ 402 to generate projected control points 404. The centerline 406 of the vasculature visible in the 2D projection image is determined using, for example, skeletonizing or erosion techniques. The differences between the projected control points 404 and the 2D vessel centerline 406 are then determined. In some implementations, the differences are determined by calculating a 2D in-plane vector indicative of the direction of the 2D vessel centerline 406 for each projected control point 404. The in-plane vectors may then be interpolated across the 3D control points 308a-b to establish a 3D representation of the projection-specific deformation field for one particular viewing angle. The 2D in-plane vectors may be calculated and interpolated for any remaining 2D projection images to establish corresponding 3D representations of the local deformation fields corresponding to multiple viewing angles (i.e. local deformation fields $W_i$).

Returning to FIG. 2, at 208, with a local deformation field W created for each projection image $y_{s,i}$ the global deformation field W may be determined by calculating the average of all the local deformation fields $W_i$. A regularization step may then be performed to penalize outliers and enforce a smooth transition.

At 210, 3D image reconstruction unit 106 determines if a convergence criterion is satisfied. The convergence criterion may be defined by, for example, a maximum number of iterations or minimum deformation magnitude change in between optimization steps. If the convergence criterion is not satisfied, steps 206 and 208 are repeated. Else, the process continues at step 212.

At 212, with the global deformation field W established, the next estimate of the 3D representation $x_1$ is set to the aligned initial 3D image data $W(x_0)$.

At 214, 3D image reconstruction unit 106 minimizes the difference between the next 3D estimate $x_1$ and the 2D projection images $y_s$ (e.g., arg min $[\|Ax_1 - y_s\|]$, wherein A denotes a system matrix) by using an iterative reconstruction scheme. An exemplary iterative reconstruction scheme includes, for example, simultaneous algebraic reconstruction technique (SART). A SART procedure may determine, average, add and/or subtract the image errors across all projection images $y_s$ to reconstruct the 3D representation $x_1$. Such procedure may then repeated until a stopping criterion is met.

If the projection images $y_s$ contain a high noise component, it may be necessary to add a roughness penalty (e.g., enforces smoothness) to the optimization method. The minimization function may take the form of arg min $[\alpha\|Ax_1 - y_s\mu + \beta(R(x_1))]$. This roughness penalty can take the form of, e.g. locally calculated squared differences, or other established penalty methods. If required, the deformable registration may be repeated at certain iterations during the iterative reconstruction process, further improving accuracy. With this method, both deformation in the vasculature in between two consecutive scans, as well as reappearing vascular structures after revascularization can advantageously be imaged with very low radiation burden.

Figure 5:
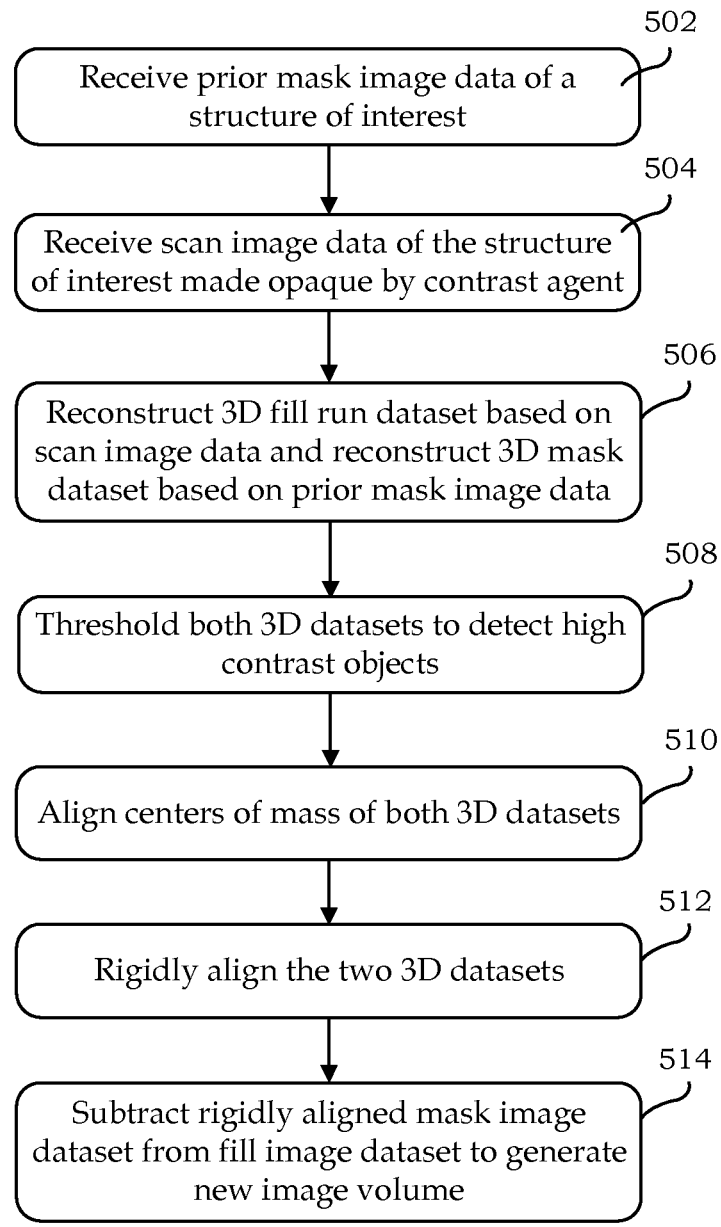
FIG. 5 shows an exemplary method of removing a mask scan from an image acquisition chain.

FIG. 5 shows an exemplary method 500 of removing the mask scan from the image acquisition chain. The exemplary method 500 may be implemented by the mask scan removal unit 107 in computer system 101, previously described with reference to FIG. 1. It should be noted that in the following discussion, reference will be made, using like numerals, to the features described in FIG. 1.

At 502, mask scan removal unit 107 receives prior mask image data of one or more structures of interest (e.g., blood vessels). The prior mask image data may include 2D and/or 3D image data that are previously acquired by, for example, imaging device 102, before any contrast agent has been administered or introduced into the one or more structures of interest.

At 504, mask scan removal unit 107 receives scan image data of the one or more structures of interest. The scan image data may include 2D image data that is acquired when or after the structure of interest is filled with the contrast agent, which makes it appear opaque or highly contrasted against the background.

At 506, mask scan removal unit 107 reconstructs a 3D (or volumetric) fill-run image dataset based on the scan image data. Additionally, mask scan removal unit 107 may further reconstruct a 3D (or volumetric) mask image dataset from the prior mask image data using the same or similar reconstruction parameters. Image reconstruction may be performed using, for example, filtered-back projection algorithms.

At 508, mask scan removal unit 107 applies an intensity threshold to both the 3D fill-run image data set and the 3D mask image data set to detect high-contrast structures, such as bone and blood vessels. In some implementations, the one or more structures of interest (e.g., vasculature) are segmented and separated from other high-contrast structures by using, for example, a region growing algorithm.

At 510, mask scan removal unit 107 aligns the centers of mass of both the 3D fill-run image data set and the 3D mask image data set. This may be performed by, for instance, aligning the moments of the image data sets, calculating the geometric center of mass of all voxel values in the image data sets, and/or creating enveloping ellipsoids of the structures of interest and aligning their centers.

At 512, mask scan removal unit 107 rigidly aligns the 3D mask image dataset to the 3D fill-run image dataset by minimizing the magnitude of a difference image. The difference image may be generated by subtracting a current estimate of the 3D mask image dataset from the 3D fill-run image dataset. To minimize the magnitude of the difference image, optimized rotation and translation matrices may be applied to the 3D mask image dataset. Optimization may be performed by, for example, using steepest descent (or gradient descent) or any other suitable numerical optimization method.

At 514, mask scan removal unit 107 generates a new subtracted 3D image dataset by subtracting the rigidly aligned 3D mask image dataset from the 3D fill-run image dataset. If patient motion was negligible during image acquisition, this may prove sufficient. In some implementations, this initial registration (or alignment) is refined by using deformable or piecewise constant deformable registration. The runtime of such deformable registration methods may be in the order of approximately one minute, especially if there is no interest in accuracy in the soft tissue domain. If a subtracted dataset is still required for secondary reconstruction, the registered data may be forward projected to generate artificial mask projections.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A non-transitory computer readable medium embodying a program of instructions executable by machine to perform steps for facilitating three-dimensional imaging implemented by a computer system, the steps comprising:
receiving prior three-dimensional (3D) image data of vasculature;
intraoperatively acquiring a sparse set of two-dimensional (2D) projection image data of the vasculature, wherein the sparse set of 2D image data is acquired after the 3D image data is acquired;
performing a deformable registration to align the 3D image data with the 2D image data; and
minimizing a difference between the aligned 3D image data and the 2D image data by performing an iterative reconstruction scheme.

2. A method of three-dimensional imaging implemented by a computer system, comprising:

receiving prior three-dimensional (3D) image data and a sparse set of two-dimensional (2D) projection image data of at least one structure of interest, wherein the sparse set of 2D image data is acquired after the 3D image data is acquired;

performing a deformable registration to align the 3D image data with the 2D image data; and minimizing a difference between the aligned 3D image data and the 2D image data by performing an iterative reconstruction scheme.

3. The method of claim 2 further comprising acquiring the prior 3D image data by performing intraoperative 3D mask and fill image acquisitions.

4. The method of claim 2 further comprising acquiring the prior 3D image data by retrieving pre-operative vessel-only 3D image data from a data source and performing an intraoperative fill 3D image acquisition.

5. The method of claim 2 further comprising intraoperatively acquiring the sparse set of 2D projection image data.

6. The method of claim 2 wherein the sparse set of 2D projection image data corresponds to two viewing angles.

7. The method of claim 2 further comprises establishing control points based on the 3D image data to drive the deformable registration.

8. The method of claim 7 wherein establishing the control points comprises:

determining a centerline of the at least one structure of interest in the 3D image data; and sparsifying the centerline to generate the control points.

9. The method of claim 7 wherein performing the deformable registration comprises generating a local deformation field that transforms the prior 3D image data along the control points to align with a 2D projection image selected from the sparse set of 2D projection image data.

10. The method of claim 9 further comprising interpolating the local deformation field using a spline.

11. The method of claim 9 wherein generating the local deformation field comprises:

projecting the control points onto the 2D projection image to generate projected control points;

determine a 2D centerline of the at least one structure of interest in the 2D projection image; and determining differences between the projected control points and the 2D centerline.

12. The method of claim 11 wherein determining the differences between the projected control points and the 2D centerline comprises calculating an in-plane vector indicative of the direction of the 2D centerline for at least one of the projected control points.

13. The method of claim 12 further comprising interpolating multiple in-plane vectors for multiple projected control points to establish a 3D representation of the local deformation field.

14. The method of claim 9 further comprising calculating a global deformation field based on multiple local deformation fields corresponding to multiple 2D projection images selected from the sparse set of 2D projection image data.

15. The method of claim 2 wherein performing the iterative reconstruction scheme comprises performing simultaneous algebraic reconstruction technique.

16. An imaging system, comprising:

a memory device for storing computer readable program code; and a processor in communication with the memory device, the processor being operative with the computer readable program code to perform steps including receiving prior mask image data of at least one structure of interest acquired before a contrast agent is administered into the structure of interest, receiving scan image data of the structure of interest, wherein the scan image data is acquired after the structure of interest is made opaque by the contrast agent, reconstructing a three-dimensional (3D) mask image dataset based on the prior mask image data, reconstructing a 3D fill-run-image dataset based on the scan image data, rigidly aligning the 3D mask image dataset with the 3D fill-run image dataset, and subtracting the aligned 3D mask image dataset from the 3D fill-run image dataset to generate a subtracted 3D image dataset.

17. The imaging system of claim 16 wherein the structure of interest comprises a blood vessel.

18. The imaging system of claim 16 wherein the processor is further operative with the computer readable program code to align centers of mass of the 3D fill-run image dataset and the 3D mask image dataset.

19. The imaging system of claim 16 wherein the processor is further operative with the computer readable program code to rigidly align the 3D mask image dataset with the 3D fill-run image dataset by generating a difference image by subtracting the 3D mask image dataset from the 3D fill-run image dataset, and minimizing magnitude of the difference image.

20. The imaging system of claim 19 wherein the processor is further operative with the computer readable program code to minimize the magnitude of the difference image by applying optimized rotation and translation matrices to the 3D mask image dataset.

* * * * *